A. R. PRIBIL.
METHOD OF MAKING CONNECTING RODS.
APPLICATION FILED MAY 31, 1918.

1,350,178. Patented Aug. 17, 1920.

Witness
Chas. W. Stauffiges
Karl H. Butler

Inventor
Alexis R. Pribil,
By
Attorney

UNITED STATES PATENT OFFICE.

ALEXIS R. PRIBIL, OF SAGINAW, MICHIGAN.

METHOD OF MAKING CONNECTING-RODS.

1,350,178.  Specification of Letters Patent.  Patented Aug. 17, 1920.

Original application filed December 6, 1917, Serial No. 205,765. Divided and this application filed May 31, 1918. Serial No. 237,576.

*To all whom it may concern:*

Be it known that I, ALEXIS R. PRIBIL, a citizen of the United States of America, residing at Saginaw, in the county of Saginaw and State of Michigan, have invented certain new and useful Improvements in Methods of Making Connecting-Rods, of which the following is a specification, reference being had therein to the accompanying drawings.

This invention relates to a method of making connecting rods, and has special reference to a method for expeditiously and economically producing what is commonly known as "pressed steel" connecting rods, and as instances of such rods there might be mentioned the subject matter of my pending applications Serial No. 138,955, filed Dec. 26, 1916; Serial No. 180,053, filed July 12, 1917, and Serial No. 199,427, filed Oct. 31, 1917. These applications disclose connecting rods which are characterized by novel one-piece caps, reinforcing ribs or members that add strength and rigidity to the drive end of each rod, and novel means including U bolts for connecting the caps to the driven ends of the connecting rods.

This particular application is a division of my pending application on a method of making connecting rods, filed Dec. 6, 1917, Serial No. 205,765, and is directed to a method of manufacture which was evolved wholly or in part, during the production of the rods shown in my pending applications, and while some of the rods have been shown as having special fastening means for detachable caps, the present method of manufacture not only includes this special type of connecting rod, but is applicable to any rod made of pressed steel or a similar material.

This invention relates to a method of manufacture involving a plurality of operations or steps by which two connecting rods may be practically completed. As with any pressed steel connecting rod, there is a shank, a drive end and a driven end, the latter being completed by a detachable cap. The shank, drive end and a portion of the driven end, are ordinarily made of two pieces of material properly stamped and formed, placed back to back and suitably connected. It has been the practice in the past to make one part of a single connecting rod at a time, and in some instances, parts of the cap have been included necessitating cutting or sawing the driven end of the connecting rod, after the parts are assembled, to provide a detachable cap. In contradistinction to such practice, my method involves the making of two shanks at one time, and making the detachable cap by operations altogether independent of those employed for producing the shanks, drive end, and driven end of a connecting rod.

The various operations or successive steps of the process employed by me for forming a connecting rod will be hereinafter considered and to assist in an understanding of the invention reference will be had to the drawing, wherein—

Figure 1:
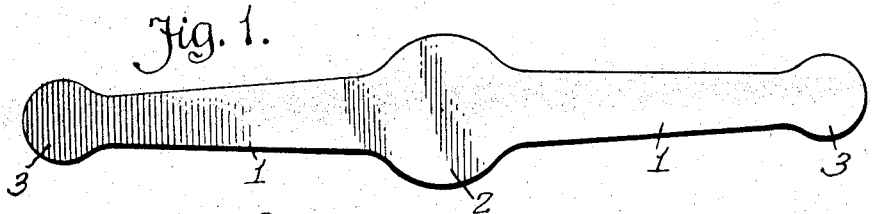
Figure 1 is a plan of a double blank from which shank parts may be formed.

As stated in the beginning, I make the main part of two connecting rods at one time and in carrying my process into practice, I first cut or stamp from metal, as various kinds of steel or alloys, a double blank as shown in Fig. 1, this blank having tapering shank portions 1, a substantially circular intermediate portion 2, and substantially circular end portions 3. The central portion 2 eventually is formed into parts of the driven end of two connecting rods, and the end portions 3 eventually form the driving ends of two connecting rods. To produce this blank, a suitable die may be employed and other dies or formers may be employed for performing additional operations in connection with the blank.

Figure 2:
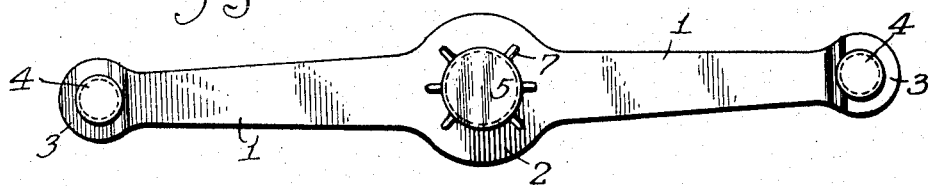
Fig. 2 is a similar view showing the formation of piston pin bosses and reinforcing ribs.
Figure 3:
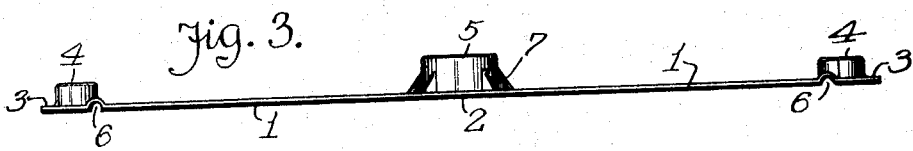
Fig. 3 is an edge view of the same.

The second operation or step of the process is shown in Figs. 2 and 3, where the blank is stamped or pressed to provide piston pin bosses 4 at the end portions 3 and a crank boss 5 at the central portion 2. The bosses 4 and 5 are drawn from the end portions 3 and the central portion 2 of the blank, and adjacent the piston pin bosses 4 are raised portions 6 which contribute to the formation of sleeves in the completed connecting rods. Contiguous to the crank boss 5 are a plurality of stiffening ribs 7 and as pointed out in my previous applications, these ribs are essential to reinforce the crank boss at its juncture with the shank portions 1 so as to prevent cracking or other injury to these portions of the connecting rod when subjected to excessive stresses and strains. Furthermore, it will be noted that the bosses, sleeve portions and ribs are all on one side of the double blank. Consequently dies or their mechanical equivalent can be advantageously used for so forming the blank.

Figure 4:
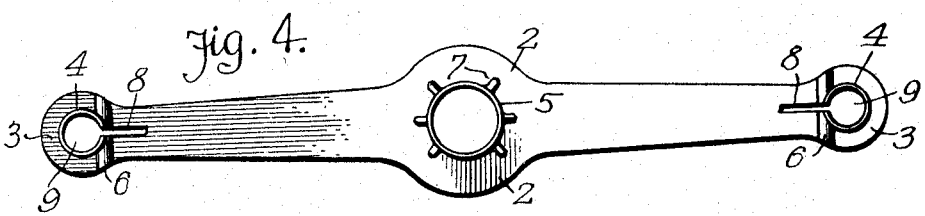
Fig. 4 is a plan of the pressed blank, it having its bosses apertured and the ends slotted.

The blank is now in condition for the third operation which has been shown in Fig. 4, said operation consisting of aperturing the bosses 4 and 5 and slotting the outer ends of the shank portions 1, as at 8, said slots communicating with the apertures 9 in the bosses 4. These slots will permit of the driving ends of the connecting rods being contracted about the piston pins.

Figure 5:
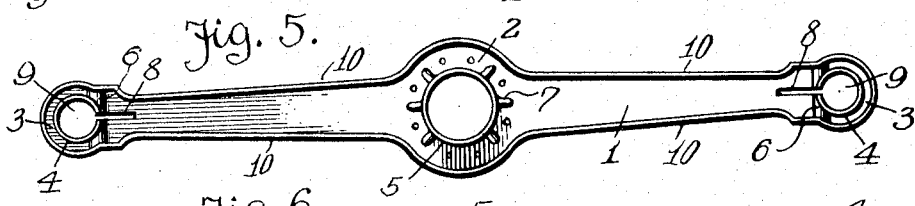
Fig. 5 is a similar view showing the formation of flanges.
Figure 6:
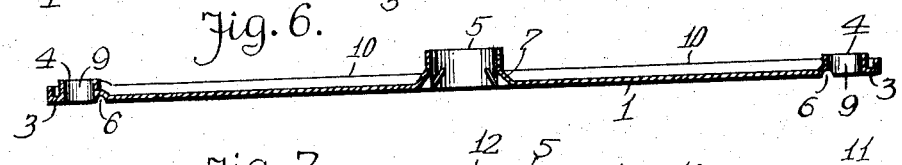
Fig. 6 is a longitudinal sectional view of the same.

Next in order is the fourth operation whereby the double pressed and apertured blank is provided with marginal outstanding flanges 10, said flanges imparting a channel shape to shank portion 1 of the double blank. By reference to Fig. 6, showing a longitudinal sectional view of the double blank as illustrated in Fig. 5, it will be noted that the apertured bosses 4 and 5 provide outstanding flanges at the intermediate and end portions of the blank and that the flanges or walls of the openings in the end portions of the blank are of a greater depth than the marginal flanges 10, while the walls of the opening in the crank boss 5 are necessarily of greater depth than the flanges 10 in order to afford a wide driven end for a connecting rod.

Figure 7:
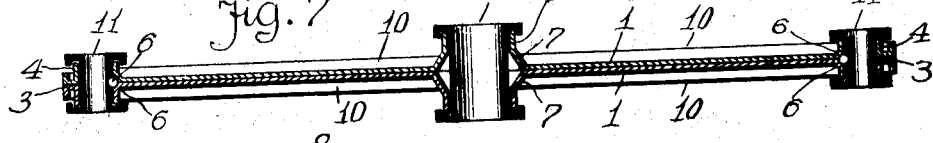
Fig. 7 is a similar view showing the parts, each prepared by the operations or steps of the process illustrated in Figs. 1 to 6 inclusive, and connected by ferrules or other fastening means.
Figure 8:
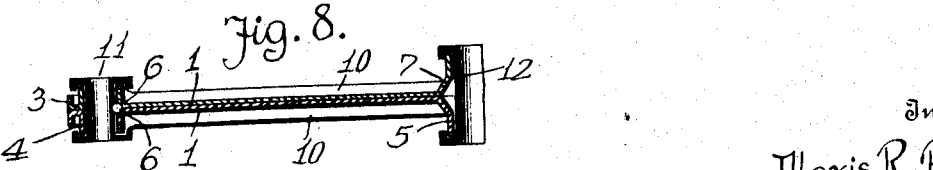
Fig. 8 is a longitudinal sectional view of one-half of the double form shown in Fig. 7, which is obtained by sawing or otherwise cutting the double form into two equal parts.

Thus far, I have formed two integral connecting rod parts that may be considered as having integral driven ends and after two of such double blanks are formed, I place the same back to back, as shown in Fig. 7, and these contacting double blanks are now ready for the fifth operation or step of the process, which consists in mounting ferrules 11 in the end portions of the blanks and a ferrule 12 in the central portion of the blanks. The ferrules 11 and 12 may be made of brass provided with Babbitt linings or bushings, and the ends of said ferrules are adapted to be turned over on the walls of the bosses 4 and 5 of the double blank, said ferrules constituting mechanical means for holding the blank sections in adjoining relation. It is during or at this stage of the process that riveting, spot welding or any other fastening may be resorted to for connecting shanks and other portions of the double blank.

Bearing in mind that I now have two integral, partially complete connecting rods, the sixth operation or step is that of sawing or otherwise transversely dividing the integral connecting rod parts. One of the parts is shown in Fig. 5 and is obtained by sawing or dividing the integral connecting rods shown in Fig. 7 in the plane of the longitudinal axis of the crank bosses 5, whereby each severed part will have a driven end devoid of a cap. Otherwise the body of a single connecting rod is complete.

From the foregoing it will be noted I have produced a connecting rod body, part or parts, devoid of a cap and I do not care to confine my invention to the sequence of steps other than defined by the appended claims.

What I claim is:—

1. In the art of producing connecting rods, wherein the rod is formed of a rod portion and a cap separable therefrom, and wherein the rod portion includes an embryo assembly of two members of similar configuration together with bushing formations for the piston pin and crank pin openings, the method of producing such assembly which consists in shaping a sheet metal blank symmetrically relative to a central transverse line to produce two configurations each having a piston pin boss at its outer end and a single crank pin boss symmetrically disposed relative to such line, positioning a similar blank in assembly relation thereto with similar boss configurations axially alined and projecting in opposite directions, securing the blanks in such relation by bushing formations shaped to locate the opposite ends of a bushing in overlying relation to the outer ends of the alined boss configurations of both blanks, and bisecting the assembly on such transverse line.

2. In the art of producing connecting rods, wherein the rod is formed of a rod portion and a cap separable therefrom, and wherein the rod portion includes an embryo assembly of two members of similar configuration together with bushing formations for the piston pin and crank pin openings, the method of producing such assembly which consists in shaping a sheet metal blank symmetrically relative to a central transverse line to produce two configurations each having a piston pin boss at its outer end and a single crank pin boss symmetrically disposed relative to such line, positioning a similar blank in assembly relation thereto with similar boss configurations axially alined and projecting in opposite directions, securing the blanks in such relation by bushing formations shaped to locate the opposite ends of a bushing in overlying relation to the outer ends of the alined boss configurations of both blanks with the overlying portions inclosing the faces of the boss ends, and bisecting the assembly on such transverse line.

3. In the art of producing connecting rods, wherein the rod is formed of a rod portion and a cap separable therefrom, and wherein the rod portion includes an embryo assembly of two members of similar configuration together with bushing formations for the piston pin and crank pin openings, the method of producing such assembly which consists in shaping a sheet metal blank symmetrically relative to a central transverse line to produce two configurations each having a piston pin boss at its outer end and a single crank pin boss symmetrically disposed relative to such line, positioning a similar blank in assembly relation thereto with similar boss configurations axially alined and projecting in opposite directions, securing the blanks in such relation by bushing formations each of greater length than the length of the alined boss configurations and shaped to locate the projected end portions in overlying relation to the outer ends of such alined boss configurations, and bisecting the assembly on such transverse line.

In testimony whereof I affix my signature in the presence of two witnesses.

ALEXIS R. PRIBIL.

Witnesses:
C. BROWN,
L. THOMPSON.